Figure 1:
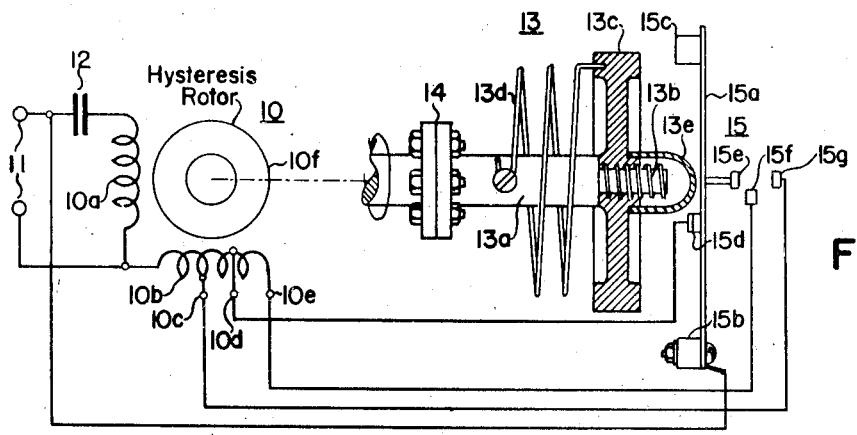

Jan. 4, 1949.  H. C. ROTERS  2,458,100

HYSTERESIS MOTOR CONTROL SYSTEM AND METHOD OF OPERATION

Filed Aug. 9, 1946  2 Sheets-Sheet 1

INVENTOR.
HERBERT C. ROTERS

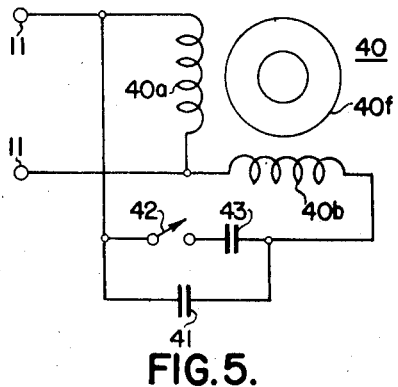
FIG.5.
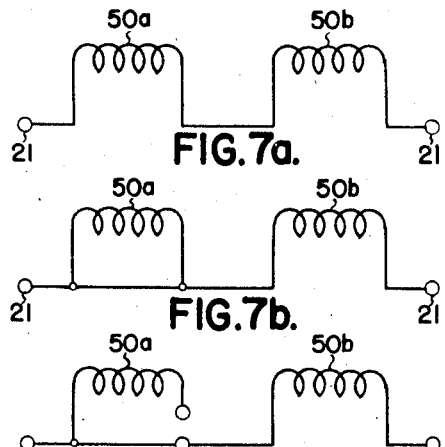
FIG.7a.
FIG.7b.
FIG.7c.
FIG.7d.
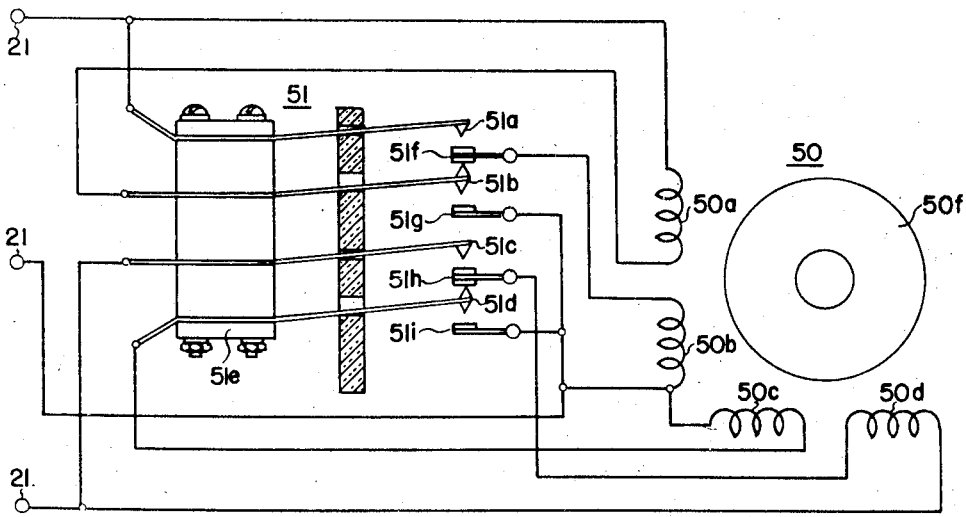
FIG.6.
INVENTOR.
HERBERT C. ROTERS
BY Patented Jan. 4, 1949

2,458,100

UNITED STATES PATENT OFFICE 2,458,100

HYSTERESIS MOTOR CONTROL SYSTEM AND METHOD OF OPERATION

Herbert C. Roters, Kew Gardens, N. Y., assignor, by mesne assignments, to Casner Patents, Inc., New York, N. Y., a corporation of New York Application August 9, 1946, Serial No. 689,386

22 Claims. (Cl. 318—166)

1

This invention relates to hysteresis motor control systems and methods of operation thereof and more particularly to such systems and methods effective to reduce the magnetizing current of the motor under normal operating conditions.

In applicant's prior patent, No. 2,328,743, there is described and claimed a method of operating a hysteresis synchronous motor at an abnormally high magetomotive force either during the period of acceleration to synchronism or momentarily at synchronism, for the purpose of reducing the magnetizing current of the motor during normal operation. This invention is directed to a system for effecting this "over-magnetization" automatically without the necessity of manual switching or personal supervision. In order that the full benefits of over-magnetization be realized, it is necessary that the over-magnetization be applied to the motor momentarily while it is in synchronism or at least up to the point at which synchronism is reached. Therefore, any automatic switching means utilized to effect this over-magnetization must be accurately sensitive to the condition of synochronism and maintain such over-magnetization until synchronism is reached. Ordinary devices which have been commonly used in the prior art, such as centrifugal switches, for the purpose of controlling the starting of motors are not sufficiently accurate and are, therefore, not suitable for this purpose.

It is an object of the invention, therefore, to provide a new and improved hysteresis motor control system for effecting momentary over-magnetization of the motor at or during synchronism to reduce the normal magnetizing current of the motor.

It is another object of the invention to provide a new and improved method of operation of hysteresis motors in which the over-magnetization of the motor is effected automatically in response to the acceleration of the motor.

In accordance with the invention, an electrical control system for a hysteresis synchronous motor including a magnetic armature of material having a high hysteretic constant comprises an acceleration-responsive device adapted to be driven by the motor, circuit-controlling means disposed to be actuated by the device, and an energizing circuit for the motor including the circuit-controlling means for developing in the motor an abnormally high magnetomotive force.

Further in accordance with the invention, a method of operating a hysteresis synchronous motor including a magnetic armature of material having a high hysteretic constant comprises operating the motor at an abnormally high magnetomotive force whenever the acceleration of the motor is above a given value and reducing the magnetomotive force of the motor whenever the acceleration of the motor is less than such value, thereby to reduce the normal magnetizing current required by the motor.

Further in accordance with the invention, a method of operating a hysteresis synchronous motor including a plurality of phase windings and a magnetic armature of a material having a high hysteretic constant comprises, operating one phase winding of the motor momentarily at an abnormally high magnetomotive force to magnetize the armature, and thereafter reducing the magnetomotive force of such phase winding to its normal value, thereby to reduce the normal magnetizing current required by the motor.

For a better understanding of the present invention, together with other and further objects thereof, reference is had to the following description taken in connection with the accompanying drawings, and its scope will be pointed out in the appended claims.

Figure 2:
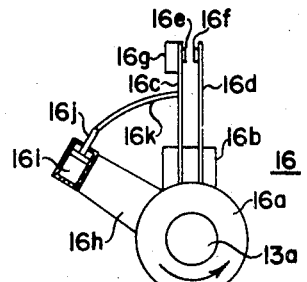

Referring now to the drawings,

Fig. 1 represents a hysteresis motor control system, partially schematic, embodying the system of the invention and capable of operating in accordance with the method of the invention; Fig. 2 is an end view of an alternative form of acceleration-responsive device suitable for use in the system of Fig. 1; Figs. 3–6, inclusive, are circuit diagrams of alternative electrical systems for effecting over-magnetization of a hysteresis motor and suitable for actuation by the acceleration-responsive device of Fig. 1 or Fig. 2; while, Figs. 7a–7d, inclusive, are simplified winding connections of the motor of Fig. 6 effected in the several positions of the acceleration-responsive device.

Referring now to Fig. 1 of the drawings, there is represented an electrical control system for a hysteresis synchronous motor 10. The motor 10 includes one phase winding 10a connected across alternating-current supply terminals 11 through a phase-shifting condenser 12 and a second multi-section phase winding 10b provided with intermediate winding terminals 10c, 10d and an end terminal 10e. The motor is also provided with a magnetic armature member 10f of material having a high hysteretic constant, for example, an aluminum-nickel-cobalt alloy, commercially available under the trade name "Alnico."

The control system of Fig. 1 also includes an acceleration-responsive device 13 adapted to be driven by the motor 10 in any conventional manner, as by mounting it directly on the motor shaft, gearing it thereto or, as illustrated, by means of a flange coupling 14. The device 13 includes a driven member, such as a shaft 13a, having a threaded portion 13b and connected to be driven by the motor shaft through the coupling 14. The device 13 also includes an inertia member having a lost-motion driving connection with the driven shaft 13a, this driving connection having a resilient link. Specifically, the inertia member may be a flywheel 13c threaded on and axially movable along the portion 13b of the shaft 13a and the resilient link may be a helical torsion spring 13d, connected at one end to the shaft 13a and at the other end to the flywheel 13c, as illustrated, and effective to drive the flywheel 13c from the shaft 13a.

The system of Fig. 1 also includes circuit-controlling means disposed to be actuated by the acceleration-responsive device 13, this circuit-controlling means being in the form of a leaf-spring switch 15 comprising a leaf spring 15a rigidly mounted at one end on a support 15b and resting at the other end against a fixed support 15c. The member 15a is disposed to be displaced from the rest 15c by axial movement of the inertia flywheel 13c along the threaded shaft portion 13b whenever the acceleration of the motor 10 is above a given value, for example, substantially above zero. To this end, there is attached to the flywheel 13c a cup-shaped member 13e disposed to engage the spring member 15a upon relatively small initial axial movement of the flywheel 13c along the shaft portion 13 b. The switch 15 may be provided with normally open or normally closed contacts, or both, in accordance with the controlling functions desired. For example, the switch 15 illustrated is provided with a pair of normally closed back contacts 15d and a movable contact 15e forming with stationary contacts 15f and 15g normally open contacts 15e, 15f and 15e, 15g.

The control system of Fig. 1 also includes an energizing circuit for the motor including the circuit-controlling means or switch 15 for developing in the motor an abnormally high magnetomotive force. The circuit-controlling means may be connected in a variety of ways to control the energization of the motor windings. In the system of Fig. 1, the switch 15 is connected to modify the connections of the sections of the phase winding 10b; specifically to decrease the number of winding sections energized when the motor acceleration is substantially above zero. For example, the switch 15 has a first position, in which it is illustrated, corresponding to substantially zero acceleration of the motor in which its normally closed contacts 15d are effective to connect one side of the supply circuit to the intermediate terminal 10d to include an intermediate number of sections of the phase winding 10b in the energizing circuit; the switch 15 also has a second position, corresponding to initial movement of the inertia member 13c along the threaded shaft portion 13b, in which the contacts 15d are open while the contacts 15e, 15f are closed to connect the supply circuit terminals to the outer winding terminal 10e of phase winding 10b, thus to connect the maximum number of winding sections in series across the supply circuit to develop a subnormal starting magnetomotive force; while the switch 15 has a third position in which the contacts 15e, 15g are closed, which occurs an appreciable interval later corresponding to the movement of the flywheel 13c to its extreme right-hand position, in which the supply circuit terminals are connected to the lowest terminal 10c of the phase winding 10b so that only a single winding section is connected across the supply circuit, resulting in the development of an abnormally high magnetomotive force in the motor.

It is believed that the operation of the motor control system of Fig. 1 will be apparent to those skilled in the art from the foregoing description. In brief, the method of operation of the system is as follows: In the positions of the several elements of the system as shown in Fig. 1, with the contacts 15d of the switch 15 closed, the supply potential across the terminals 11 is applied to the intermediate terminal 10d of the phase winding 10b and this phase winding, in conjunction with the phase winding 10a excited through the phase-shifting condenser 12, produces a rotating magnetic field causing the hysteresis motor 10 to rotate in a manner well understood in the art and as described more fully in applicant's prior Patent No. 2,328,743, granted September 7, 1943, and entitled "Self-starting hysteresis motor." However, as soon as the motor 10 commences to rotate, the resilient driving spring 13d interconnecting the shaft 13a and the flywheel 13c permits the latter to lag behind the motor rotation due to its inertia, so that it moves axially to the right along the threaded shaft portion 13b. The initial movement of the flywheel 13c actuates the spring member 15a to open the contacts 15d quickly, so that an intermediate value of magnetomotive force resulting from applying the supply voltage to the intermediate tap 10d is developed only momentarily and may, as a practical matter, be disregarded. Immediately thereafter, continued movement of the flywheel 13c actuates member 15a to close the contacts 15e, 15f to complete the connections from the supply circuit to the outer terminal 10e of the phase winding 10b. This connection of the supply circuit across the full winding 10b results in the development in the motor 10 of a minimum or subnormal magnetomotive force for starting the motor. The effect of this is to limit the magnitude of the motor starting current and to limit the initial torque developed by the motor which might tend to injure any connected load. It is well understood that, in the case of motors of appreciable size, it is frequently desirable to limit the starting current to a moderate value for a variety of reasons. However, when subnormal starting current is not required, it will be understood that the contact 15f may be omitted and the contacts 15e and 15g arranged to close substantially immediately after the opening of contacts 15d.

As the motor 10 accelerates toward synchronous speed, the flywheel 13c lags farther behind the rotating shaft 13a and continues to move axially to the right, as shown in Fig. 1, until, in its extreme position, the contacts 15e, 15f are open and, immediately thereafter, the contacts 15e and 15g are closed, completing the circuit from the supply terminals 11 to the terminal 10c of the winding 10b, thus connecting only a single section of the phase winding 10b directly across the supply circuit and developing in the motor 10 an abnormally high magnetomotive force. This last connection is made whenever the acceleration of the motor 10 is above a given value, preferably any value substantially above zero, for a sufficient interval to provide movement of the flywheel 13c along the threaded shaft 13b to its extreme right-hand position.

When the motor reaches synchronous speed, its acceleration drops to zero and may, in certain cases, become negative in case the motor overshoots synchronism lightly. When the acceleration falls below that effective to cause the flywheel 13c to lag behind the shaft 13a against the torsion of the spring 13d, and preferably when it has dropped substantially to zero, the spring 13d returns the flywheel 13c to the position illustrated in Fig. 1 and the contacts of the switch 15 are operated in a reverse sequence until the contacts 15d are again closed, corresponding to normal operation of the motor, at which the supply circuit terminals 11 are connected to the intermediate terminal 10d of phase winding 10b, thereby reducing the magnetomotive force developed in the motor 10 to its normal value.

As explained in more detail in the aforementioned Patent 2,328,743, this momentary over-magnetization of the motor 10 at or near synchronous speed over-excites the rotor 10f so that the motor 10 operates effectively as a normally excited or over-excited synchronous motor, rather than as an under-excited synchronous motor, which is the normal method of operation of a hysteresis motor. The result of this over-excitation of the rotor 10f is to cause the motor to draw reduced magnetizing current, reduced resultant current, with a corresponding reduction in copper losses, and to operate at or near unity power factor, all of which operating characteristics are of well-recognized desirability. This over-magnetization of the motor during starting also increases the starting torque during the portion of the starting cycle in which it is effective and also increases the synchronizing torque of the motor.

It is to be noted that in the system of Fig. 1 only the phase winding 10b is momentarily over-excited in response to acceleration of the motor 10, for the purposes described, as this considerably simplifies the switching mechanism. However, it has been shown by experiment that the over-magnetization of a single-phase winding of such a polyphase hysteresis motor procures substantially the same beneficial reduction in normal magnetizing current and improvement in power factor as does a momentary over-magnetization of all phase windings. It is to be understood, therefore, that when reference is made to developing an abnormally high magnetomotive force in the motor, it is intended to refer to the over-excitation of one or all of the motor phase windings.

It is to be further noted that, upon the closing of the contacts 15e, 15g resulting in over-magnetization of the motor 10, the torque developed by the motor and its acceleration are further increased, with the result that the inertia flywheel 13c is still more strongly urged to its right-hand position and increases the contact pressure between the contacts 15e, 15g, thereby avoiding any fluttering of the contacts which would result in erratic behavoir of the motor. It is to be further noted that the electrical system of Fig. 1 includes no slip rings or commutator but that the modification of the circuit connections is effected solely by the opening and closing of fixed contacts and co-operating movable contacts carried by the switch member 15a.

In Fig. 2 there is represented an alternative form of acceleration-responsive device 16 in which, for the sake of simplification, there are illustrated only a single pair of normally open contacts, although it will be understood that the number and type of contacts may be selected in accordance with the functions to be performed.

The device 16 comprises a hub 16a mounted on shaft 13a and having a radial arm 16b from which are supported resilient contact arms 16c and 16d carrying relatively movable contacts 16e and 16f, respectively. The contact arm 16c also carries at its outer end an inertia mass or weight 16g. The device is also provided with an angularly displaced radial arm 16h on the outer end of which is carried a dashpot 16i and plunger 16j connected by an arcuate link 16k to the contact arm 16c.

In the arrangement of Fig. 2, acceleration of the shaft 13a in the direction indicated by the arrow is effective to cause the mass 16g to lag behind the other movable portions of the device, resulting in the closing of the contacts 16e, 16f so long as the acceleration of the motor is above a predetermined minimum value, preferably substantially above zero. Obviously, whenever the acceleration of the shaft 13a drops below such value, the resilient contact arm 16c will restore the mass 16g to its normal position, illustrated in Fig. 2, opening the contacts 16e, 16f. The effect of the dashpot 16i and plunger 16j is to control the rate of movement of the mass 16g between the circuit opening and circuit closing positions, thus introducing a time delay into either or both of these operations. It is further effective to stabilize the mass 16g and to prevent a fluttering of the contacts 16e, 16f near the point of transition between circuit opening and circuit closing positions.

Figure 3:
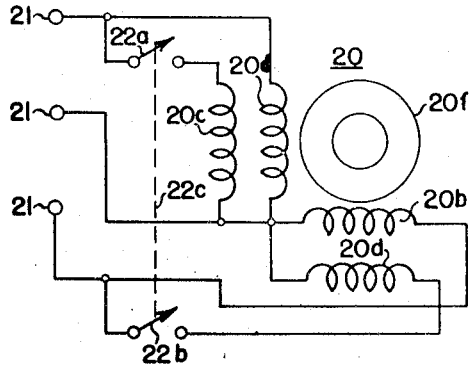

In Fig. 3 there is represented a modification of the control system of the invention as applied to the operation of a two-phase motor 20 from two-phase alternating-current supply circuit terminals 21. The motor 20 comprises an armature 20f which may be like the armature 10f of the motor 10, and is provided with main phase windings 20a and 20b connected directly to the supply circuit terminals 21 and with auxiliary starting windings 20c and 20d associated with the windings 20a, 20b, respectively, and adapted to be connected in parallel therewith through a two-pole switch comprising contacts 22a, 22b actuated by a mechanism indicated schematically at 22c, which may be the acceleration-responsive device of either Fig. 1 or 2. If desired, only one auxiliary starting phase winding need be supplied, in which case only one of the contacts 22a, 22b need be provided.

The operation of the system of Fig. 3 is in all respects similar to that of Fig. 1 described above; the motor windings are somewhat more complicated and, therefore, somewhat more expensive, but it has the advantage of a completely symmetrically rotating field during starting and synchronizing, which imparts to the motor a somewhat higher synchronizing torque.

Figure 4:
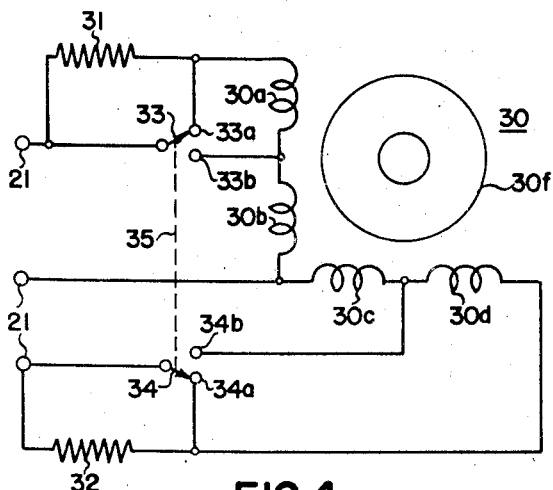

In Fig. 4 there is represented a further modified form of the control system of the invention including a two-phase motor 30 having an armature 30f which may be similar to the armature 10f of the motor 10. The motor 30 is provided with two phase windings, each made up of two sections; namely, the sections 30a and 30b making up one phase winding, and the sections 30c and 30d making up the other phase winding. These windings are connected in series across the respective phases of the two-phase supply circuit terminals 21, while impedance means, such as resistors 31 and 32, are normally connected in circuit with the windings 30a and 30d, respectively, when the winding connections are changed to exclude these winding sections.

The system also includes circuit-controlling means, specifically the switch contacts 33 and 34, effective to change the number of winding sections energized. Specifically, the switch contacts 33 and 34 are adapted to be operated by an acceleration-responsive device indicated schematically at 35. The switch contact 33 is movable between the contacts 33a and 33b simultaneously with movement of the switch contact 34 between contacts 34a and 34b. With the switch contacts 33 and 34 in the positions illustrated in Fig. 4, the motor phase windings are excited normally by direct connection in series across the supply circuit terminals 21, 21. When the switch contacts 33 and 34 are moved to engage contacts 33b, 34b, respectively, in response to acceleration of the motor above a given value, only the winding sections 30b and 30c are connected across the supply terminals 21, thus developing an abnormally high magnetomotive force in both phase windings and over-exciting the motor in accordance with the principles outlined above. During the movement of the switch contacts between these positions, the resistors 31 and 32 serve to provide circuit continuity. If the switch arms were allowed to bridge the contacts during the transition, sections 30a and 30c of the motor winding would be momentarily short-circuited, causing severe arcing at the contacts. Resistors 31 and 32 are preferably selected of such a value as to maintain a minimum torque during the transition. When the motor is started without load or under light load, these resistors can be omitted, provided that the rotor does not slow down perceptibly below synchronism during this period. If the resistors 31 and 32 are of too low an impedance value, undesirably large circulating currents will flow while the movable contacts engage contacts 33b and 34b.

In the modification of the invention represented in Fig. 5, the two-phase motor 40 is provided with an armature 40f which may be similar to the armature 10f of the motor 10. The motor 40 is further provided with single-section or untapped phase windings 40a and 40b, the former being connected directly across the single-phase alternating-current supply terminals 11, 11 and the latter being normally connected across the terminals 11 through a phase-shifting condenser 41. It is to be noted that the condenser 41 effectively comprises impedance means normally in circuit with the phase winding 40b of the motor.

The system further includes circuit-controlling means, such as a movable switch contact 42 effective to reduce the value of the impedance means effectively in circuit with the motor. Specifically, there is provided an auxiliary condenser 43 adapted to be connected in parallel with the condenser 41 by means of the switch contact 42. It will be understood that the switch contact 42 is adapted to be operated by the acceleration-responsive device of either Fig. 1 or Fig. 2. Upon its operation, the connection of the condenser 43 in parallel with the condenser 41 reduces the impedance effectively in series with the phase winding 40b, thus increasing the current therein and the magnetomotive force developed thereby. It will be clear that the principles of operation of this modification are similar to the previously described modifications.

In Fig. 6 there is represented an electrical control system for changing the connections of a plurality of winding sections of each of the phase windings of a polyphase motor from series to parallel connection in response to the acceleration of the motor to develop the desired abnormally high magnetomotive force. Specifically, in the system of Fig. 6 the hysteresis motor 50 comprises an armature 50f which may be similar to the armature 10f of the motor 10. The motor 50 also includes a first phase winding made up of winding sections 50a and 50b and a second phase winding made up of winding sections 50c and 50d. The windings 50a, 50b and 50c, 50d are connected to be excited through a circuit-controlling mechanism or switch 51 from the two-phase alternating-current supply circuit terminals 21.

The switch 51 includes four movable contacts 51a, 51b, 51c, and 51d mounted on spring arms secured to a fixed support 51e. These movable contacts co-operate with four fixed contacts 51f, 51g, 51h, and 51i. The four spring contacts 51a—51d, inclusive, are adapted to be actuated by a common reciprocable operating arm 51j adapted to be actuated by an acceleration-responsive device such as that illustrated in Fig. 1 or Fig. 2. The contact arms of the spring contacts 51a and 51c pass through relatively narrow apertures in the actuating arm 51j, while the spring arms of the contacts 51b and 51d pass through relatively wide apertures in the member 51j, so that, in a second position of the switch, a contact is made between contacts 51a and 51f and 51c and 51h before it is broken between contacts 51b and 51f and 51d and 51h. Subsequently, in a third position of the switch, contacts are broken between contacts 51b and 51f and, in a fourth position, contacts are made between contacts 51b and 51g and between contacts 51d and 51i. The contacts between contacts 51a and 51f and between 51c and 51h are maintained in the second, third, and fourth positions of the switch. The result is effectively a four-position switch which changes the winding connections of each of the phases in accordance with the simplified circuit connections of Figs. 7a–7d, inclusive, representing the change in connections of the winding sections 50a and 50b. Thus, in the first position of the switch 51 illustrated, the windings 50a and 50b are connected in series across one phase of the supply circuit terminals 21. In the second position of the switch, the winding 50a is short-circuited by the contacts 51a, 51f, 51b so that only the winding section 50b remains in circuit. In the third position of the switch 51, the contacts 51b, 51f are broken, thus removing the short-circuit from the winding 50a and leaving it on open-circuit while the winding 50b remains connected across one phase of the supply circuit terminals 21. In the fourth and final position of the operating member 51j, the windings 50a and 50b are connected in parallel through the contacts 51b and 51g and the contacts 51a and 51f. The spacing of the several stationary and movable contacts of the switch 51 is such that, in the transition from the series connection in the section of Fig. 7a to the parallel section of Fig. 7d, the circuit through one or both of the winding sections of each phase winding is at no time interrupted. This type of circuit control is ideal in minimizing the duty on the circuit-controlling switch and eliminating the requirement for discharge resistors or condensers which, in some instances, may more than compensate for the additional complexity.

It will be understood that the operation of the system of Figs. 6, 7a–7d, inclusive, is in all respects similar to that described above, normal magnetization being effected in the position of the switch corresponding to Fig. 7a, and abnormally high magnetomotive force being developed when the winding sections are connected in parallel, as represented in Fig. 7d.

Thus there is provided by the invention a hysteresis motor control system and a method of operation thereof which is effective completely automatically to develop an abnormally high magnetomotive force in one or both phases of a hysteresis motor whenever the acceleration of the motor is above a predetermined value, preferably substantially above zero, in order to reduce the normal magnetizing current of the motor and thus to improve its efficiency and its power factor.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. The method of operating a hysteresis synchronous motor including a magnetic armature of material having a high hysteretic constant which comprises, operating the motor at an abnormally high magnetomotive force whenever the acceleration of said motor is above a given value, and reducing the magnetomotive force of the motor whenever the acceleration of said motor is less than said value, thereby to reduce the normal magnetizing current required by the motor.

2. The method of operating a hysteresis synchronous motor including a magnetic armature of material having a high hysteretic constant which comprises, operating the motor at an abnormally high voltage whenever the acceleration of said motor is above a given value, and reducing the voltage of the motor whenever the acceleration of said motor is less than said value, thereby to reduce the normal magnetizing current required by the motor.

3. The method of operating a hysteresis synchronous motor including a magnetic armature of material having a high hysteretic constant which comprises, operating the motor at an abnormally high magnetomotive force whenever the acceleration of said motor is substantially above zero, and reducing the magnetomotive force of the motor whenever the acceleration of said motor falls substantially to zero, thereby to reduce the normal magnetizing current required by the motor.

4. The method of operating a hysteresis synchronous motor including running and starting windings and a magnetic armature of material having a high hysteretic constant which comprises, energizing both of said windings whenever the acceleration of said motor is above a given value, and energizing only said running winding whenever the acceleration of said motor is less than said value, thereby to reduce the normal magnetizing current required by the motor.

5. The method of operating a hysteresis synchronous motor including a plurality of phase windings and a magnetic armature of a material having a high hysteretic constant which comprises, operating one phase winding of the motor momentarily at an abnormally high magnetomotive force to magnetize said armature, and thereafter reducing the magnetomotive force of said one phase winding to its normal value, thereby to reduce the normal magnetizing current required by the motor.

6. The method of operating a hysteresis synchronous motor including a plurality of phase windings and a magnetic armature of a material having a high hysteretic constant which comprises, operating one phase winding of the motor momentarily at an abnormally high voltage to magnetize said armature, and thereafter reducing the voltage of said one phase winding to its normal value, thereby to reduce the normal magnetizing current required by the motor.

7. The method of operating a hysteresis synchronous motor including a plurality of phase windings and a magnetic armature of a material having a high hysteretic constant which comprises, operating one phase winding of the motor at an abnormally high magnetomotive force whenever the acceleration of said motor is above a given value, and reducing the magnetomotive force of said one phase winding to its normal value whenever the acceleration of said motor is less than said given value, thereby to reduce the normal magnetizing current required by the motor.

8. The method of operating a hysteresis synchronous motor including a magnetic armature of material having a high hysteretic constant which comprises, starting the motor at a subnormal magnetomotive force, operating the motor at an abnormally high magnetomotive force whenever the acceleration of said motor is above a given value, and reducing the magnetomotive force of the motor whenever the acceleration of said motor is less than said value, thereby to reduce the normal magnetizing current required by the motor.

9. The method of operating a hysteresis synchronous motor including a magnetic armature of material having a high hysteretic constant which comprises, starting the motor at a subnormal voltage, operating the motor at an abnormally high voltage whenever the acceleration of said motor is above a given value, and reducing the voltage of the motor whenever the acceleration of said motor is less than said value, thereby to reduce the normal magnetizing current required by the motor.

10. The method of operating a hysteresis synchronous motor including a magnetic armature of material having a high hysteretic constant which comprises, operating the motor at an abnormally high magnetomotive force whenever the acceleration of said motor is above a given value, and reducing the magnetomotive force of the motor to its normal value whenever the acceleration of said motor is less than said value, thereby to reduce the normal magnetizing current required by the motor.

11. An electric control system for a hysteresis synchronous motor including a magnetic armature of material having a high hysteretic constant comprising, an acceleration-responsive device adapted to be driven by the motor, circuit-controlling means disposed to be actuated by said device, and an energizing circuit for the motor including said circuit-controlling means for developing in said motor an abnormally high magnetomotive force.

12. An electric control system for a hysteresis synchronous motor including a magnetic armature of material having a high hysteretic constant comprising, an acceleration-responsive device adapted to be driven by the motor, circuit-controlling means disposed to be actuated by said device whenever the acceleration of the motor is above a given value, and an energizing circuit for the motor including said circuit-controlling means for developing in said motor an abnormally high magnetomotive force.

13. An electric control system for a hysteresis synchronous motor including a magnetic armature of material having a high hysteretic constant comprising, an acceleration-responsive device adapted to be driven by the motor, circuit-controlling means disposed to be actuated by said device whenever the acceleration of the motor is substantially above zero, and an energizing circuit for the motor including said circuit-controlling means for developing in said motor an abnormally high magnetomotive force.

14. An electric control system for a hysteresis synchronous motor including running and starting windings and a magnetic armature of material having a high hysteretic constant comprising, an acceleration-responsive device adapted to be driven by the motor, circuit-controlling means disposed to be actuated by said device, and an energizing circuit for the motor windings, the circuit of said starting winding including said circuit-controlling means for developing in said motor an abnormally high magnetomotive force.

15. An electric control system for a hysteresis synchronous motor including a magnetic armature of material having a high hysteretic constant comprising, a driven member adapted to be rotated by said motor, an inertia member having a lost-motion driving connection with said driven member, said driving connection having a resilient link, circuit-controlling means disposed to be actuated by said inertia member, and an energizing circuit for the motor including said circuit-controlling means for developing in said motor an abnormally high magnetomotive force.

16. An electric control system for a hysteresis synchronous motor including a magnetic armature of material having a high hysteretic constant comprising, a threaded shaft adapted to be rotated by said motor, a flywheel threaded on said shaft, a tortion spring interconnecting said shaft and said flywheel for driving the latter, circuit-controlling means disposed to be actuated by axial movement of said flywheel along said shaft, and an energizing circuit for the motor including said circuit-controlling means for developing in said motor an abnormally high magnetomotive force.

17. An electric control system for a hysteresis synchronous motor including a multi-section winding and a magnetic armature of material having a high hysteretic constant comprising, an acceleration-responsive device adapted to be driven by the motor, an energizing circuit for the motor winding, and circuit-controlling means disposed to be actuated by said device and connected to modify the connections of said winding sections for developing in said motor an abnormally high magnetomotive force.

18. An electrical control system for a hysteresis synchronous motor including a multi-section winding and a magnetic armature of material having a high hysteretic constant comprising, an acceleration-responsive device adapted to be driven by the motor, an energizing circuit for the motor winding, and circuit-controlling means disposed to be actuated by said device and connected to change the connections of said winding sections from series to parallel for developing in said motor an abnormally high magnetomotive force.

19. An electric control system for a hysteresis synchronous motor including a multi-section winding and a magnetic armature of material having a high hysteretic constant comprising, an acceleration-responsive device adapted to be driven by the motor, an energizing circuit for the motor winding, and circuit-controlling means disposed to be actuated by said device and connected to decrease the number of winding sections connected to said energizing circuit for developing in said motor an abnormally high magnetomotive force.

20. An electric control system for a hysteresis synchronous motor including a magnetic armature of material having a high hysteretic constant comprising, an acceleration-responsive device adapted to be driven by the motor, an energizing circuit for the motor, impedance means normally in circuit with the motor, and circuit-controlling means disposed to be actuated by said device for reducing the value of said impedance means effectively in circuit with the motor for developing in said motor an abnormally high magnetomotive force.

21. An electric control system for a hysteresis synchronous motor including a magnetic armature of material having a high hysteretic constant comprising, circuit-controlling means, an energizing circuit for the motor including said circuit-controlling means, and an acceleration-responsive device adapted to be driven by the motor and effective to actuate said circuit-controlling means to a first position for developing in said motor a subnormal starting magnetomotive force and to a second position for developing in said motor an abnormally high magnetomotive force.

22. An electric control system for a hysteresis synchronous motor including a magnetic armature of material having a high hysteretic constant comprising, circuit-controlling means, and an energizing circuit for the motor including said circuit-controlling means, an acceleration-responsive device adapted to be driven by the motor and effective during substantially zero acceleration of the motor to actuate said circuit-controlling means to a first position for developing in said motor a substantially normal magnetomotive force and effective in response to acceleration of the motor substantially above zero to actuate said circuit-controlling means initially to a second position for developing in said motor a subnormal starting magnetomotive force and subsequently to a third position for developing in said motor an abnormally high magnetomotive force.

HERBERT C. ROTERS.

REFERENCES CITED

The following references are of record in the file of this patent:

UNITED STATES PATENTS

| Number | Name | Date |
|---|---|---|
| 762,738 | Myers | June 14, 1904 |
| 2,328,743 | Roters | Sept. 7, 1943 |